E. F. W. ALEXANDERSON.
SYSTEM OF SHIP PROPULSION.
APPLICATION FILED APR. 26, 1913.
1,215,094.
Patented Feb. 6, 1917.
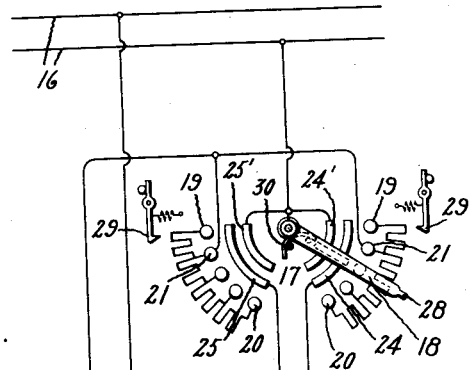
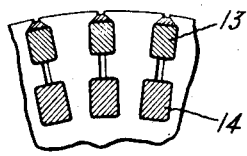
Fig. 2.
Fig. 1.
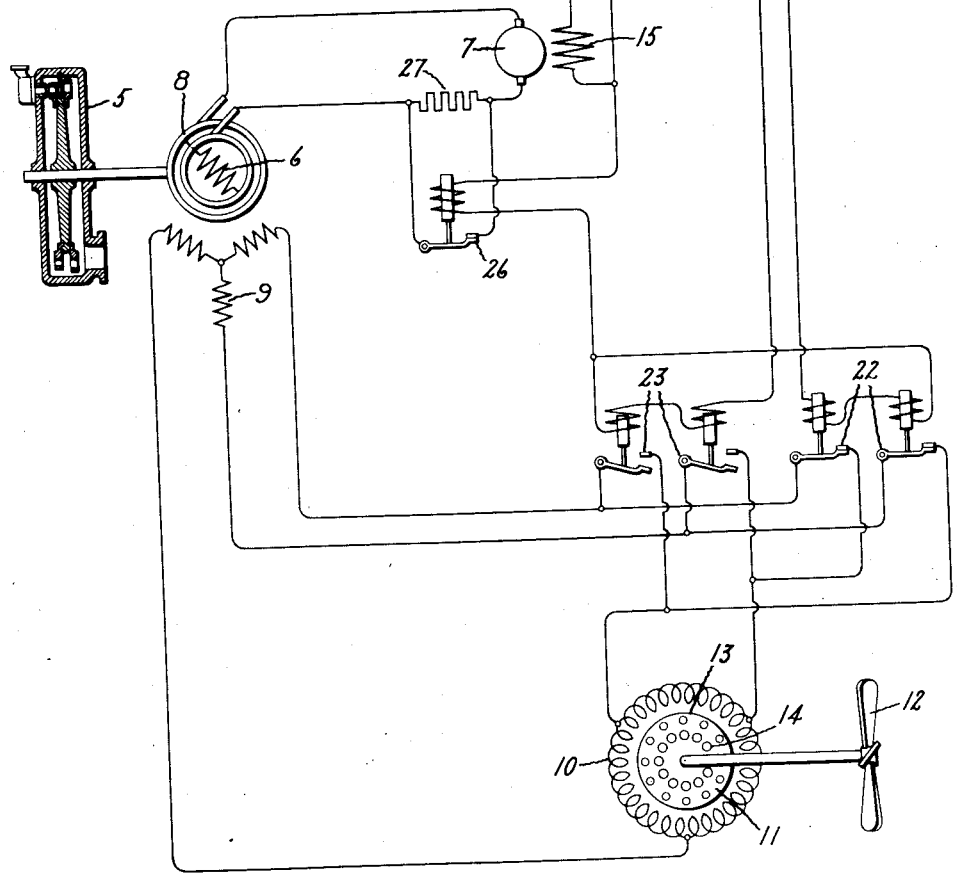
Witnesses:
Carl G. Klock.
J. Ellis Glen.
Inventor:
Ernst F. W. Alexanderson
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF SHIP PROPULSION.

1,215,094.  Specification of Letters Patent.  Patented Feb. 6, 1917.

Application filed April 26, 1913.  Serial No. 763,696.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Ship Propulsion, of which the following is a specification.

My invention relates to systems of ship propulsion, and particularly to systems in which the ship propellers are driven by electric motors. More particularly, my invention relates to systems of electric ship propulsion in which the propellers are driven by induction motors supplied with alternating current from a polyphase alternator.

The object of my invention is, broadly, to provide an improved system of electric ship propulsion, and in particular to provide an improved electric system of ship propulsion in which the propellers are driven by induction motors having permanently short circuited windings. Another object of my invention is to provide an improved method of and means for increasing the reversing torque of a propeller-driving induction motor in an electric system of ship propulsion, and in this connection the particular aim of my invention is to provide an improved method of and suitable means for enabling propeller-driving induction motors to develop sufficient torque to meet the severe requirements of reversal from high speeds. A further object of the invention is to provide an improved controlling apparatus for an electric system of ship propulsion. Other objects of the invention will be brought out hereinafter.

A system of electric ship propulsion employing induction motors having a single primary winding and a short circuited secondary winding has heretofore been considered entirely impracticable. In no practical system of ship propulsion, heretofore devised, has the use of this type of propeller driving motor been successfully or satisfactorily contemplated. I have discovered and demonstrated that it is possible and eminently practicable to provide a system of electric ship propulsion employing induction motors having a single primary winding and a permanently short circuited secondary winding. I have found the essential prerequisites for the successful operation of such a system to reside primarily in the characteristics of the induction motor, and secondarily in the design of the alternator. By the employment of an induction motor having certain characteristics an efficient system of electric ship propulsion is provided which at first blush appears to those skilled in the art utterly impracticable. This subject matter is covered in my copending application filed October 13, 1916, Ser. No. 125,507.

Induction motors are ordinarily designed to stand a fluctuating and indefinite load, and consequently one important factor to be considered in their design is the overload capacity for maximum torque which the motor can stand without breaking down. In electric ship propulsion the principal requirement of the propeller driving motor is ability to reverse from approximately full speed ahead and also to start and bring the load up to speed, while overloads beyond the normal navigating load are not likely to occur after the motor has been reversed or reached full speed. A design of induction motor, in which power factor and overload capacity are sacrificed to provide higher starting torque and high efficiency, can, therefore, be very advantageously employed in a system of electric ship propulsion. I accordingly propose to provide in a system of electric ship propulsion an induction motor having inherently a high starting torque and having furthermore normal full load operating characteristics approaching as near as possible those of the ordinary induction motor.

The characteristics which I have found to be essential to the successful operation of an induction motor in a system of ship propulsion are most satisfactorily obtained by the proper design of the secondary circuit of the motor. To this end this circuit may have an inductively changing effective resistance. That is to say, the effective ohmic resistance of the secondary winding of the motor inductively changes so that the ohmic resistance of the winding will be relatively high when the secondary current is of high frequency. A motor possessing these characteristics is capable of developing sufficient torque for all ordinary requirements of ship propulsion, but I have in addition provided in my present system further means for producing increased torque for maneuvering operations, which will be described in detail hereinafter.

In carrying out my invention I provide a polyphase alternator arranged to be electrically connected to the primary winding of one or more induction motors. Each induction motor may have a short circuited secondary winding designed to have relatively high effective resistance when the secondary current is of high frequency. Preferably the secondary winding is of the squirrel cage type and I now consider the best results to be obtained when the secondary winding comprises two sections, one section having relatively high resistance and low reactance and the other section relatively low resistance and high reactance.

The maneuvering speed regulation of the ship's propellers is obtained in the system which I have herein illustrated by a regulation of the excitation of the alternator. In order to obtain an increased torque of the motors for reversing and other maneuvering operations, I provide means for obtaining a considerable over-excitation of the alternator. The reversal of the phase rotation between the motor and the alternator is arranged to be effected when the alternator is substantially unexcited, whereby reversal of the direction of rotation of the motors is effected when there is little or no voltage on the system.

The novel features which I believe to be patentably characteristic of my invention are definitely indicated in the claims appended hereto. The arrangement and design of the apparatus in a system of ship propulsion embodying the novel features of my invention and the operation thereof will be understood from the following description taken in connection with the accompanying drawings, in which:—

Figure 1 is a diagrammatic view of the arrangement of apparatus in my system of ship propulsion, and Fig. 2 is a detail view of a preferred construction of short circuited secondary winding employed in the propeller driving motors of my system.

In the drawings there is illustrated diagrammatically an elastic fluid turbine 5 directly coupled to a polyphase alternator. I have shown for the purposes of illustration an alternator of the revolving field type having an exciting winding 6 supplied with direct current from the armature 7 of a separate exciter by means of slip rings 8 and coöperating brushes. The alternator has a polyphase stator winding 9 which is electrically connected to the primary winding 10 of a polyphase induction motor. The rotor 11 of the induction motor is operatively connected to a propeller 12 of the ship. It will be understood, of course, that more than one propeller driving motor may be employed, and I have illustrated one propeller operatively connected to one induction motor merely for the purposes of illustration.

The exciter for the alternator has a field winding 15 which is supplied with direct current from the mains 16. A rheostat 17 having a movable controller 18 is included in the field circuit of the exciter. The rheostat is so designed that when the controller is in one extreme position and coöperating with contact 19 a certain predetermined normal amount of resistance is included in the field circuit of the exciter. When the controller is in the other extreme position and coöperating with contact 20 a greater amount of resistance is included in the field circuit of the exciter. When the controller occupies a third and preferably an intermediate position, engaging with contact 21, no resistance is included in the field circuit of the exciter and in this position of the controller the excitation of the alternator will be a maximum.

The predetermined amount of resistance included in the field circuit of the exciter when the controller engages with contact 19 is that required to produce normal excitation of the alternator. This is designed to be the excitation under which the alternator operates in the ordinary navigation of the ship, and is accordingly the most efficient excitation of the alternator. When the controller engages with contact 21, the minimum amount of resistance, for example no resistance at all as illustrated in the drawings, is included in the exciter field circuit. This latter condition is designed to produce a considerable over-excitation of the alternator, and consequently an increase in its terminal voltage. The starting torque of an induction motor varies substantially as the square of the impressed voltage, and it will, therefore, be seen that the over-excitation of the alternator provides a means for obtaining a greatly increased starting torque of the propeller driving motor.

The reversal of the phase rotation between the motor and alternator, and consequently the reversal of the direction of rotation of the rotor of the induction motor, is effected by the solenoid operated switches 22 and 23. The windings of the solenoids of these switches are arranged to be connected to the supply main 16 by means of the controller 18 of the rheostat. The windings of the solenoids of switches 22 are connected to contact plate 24, and the windings of the solenoids of switches 23 are connected to contact plate 25. Contact plate 24 is adapted to be electrically connected to a coöperating plate 24′ by the controller, and similarly contact plate 25 is adapted to be electrically connected to a coöperating plate 25′. The plates 24′ and 25′ are connected to one side of the supply main 16, while the windings of the solenoids of switches 22 and 23 are connected to the other side of the supply main.

When the controller 18 engages contact plates 24 and 24', the solenoids of switches 22 will be energized and the switches 22 will be closed, while the solenoids of switches 23 will be deënergized and the switches 23 open. Similarly, when the controller engages contact plates 25 and 25', the solenoids of switches 23 will be energized and the switches 23 will be closed and the switches 22 open. In this manner the phase rotation of the motor with respect to the alternator is reversed. It will be observed that the rheostat is symmetrically arranged so as to provide the same regulation of the excitation of the alternator for both directions of rotation of the rotor 11.

The arrangement of the resistance in the rheostat is such that the reversal of the phase rotation of the motor is effected when the alternator is substantially unexcited. This is accomplished by opening the field circuit of the exciter when the controller 18 moves from contact plate 24 to contact plate 25, or vice-versa. In case it is not desired to completely open the field circuit of the exciter when the controller is moved from contact plate 24 to contact plate 25, an excessive amount of resistance can be included in the circuit during this movement. I have accordingly employed the expression "excessive amount of resistance" to include that amount of resistance required to reduce the alternator voltage to the desired value for the reversal operation, and it will be understood that this expression is intended to cover an infinite amount of resistance, as when the exciter field circuit is open.

A solenoid operated switch 26 is arranged to short circuit a resistance 27 permanently connected in series with the armature 7 of the exciter and the exciting winding 6 of the alternator. The solenoid of the switch 26 is included in series with either the solenoid windings of switches 22 or switches 23, and is accordingly energized, and the switch 26 closed, when the controller 18 engages with either contact plate 24 or control plate 25. The object of the switch 26 and the resistance 27 is to introduce a resistance in the field circuit of the alternator when the field circuit of the exciter is opened, thus preventing the production of a dangerous current in the former circuit when the alternator field collapses.

The propeller driving induction motor must be designed to give the characteristics hereinbefore mentioned. To this end, I have found that a permanently short circuited secondary winding of inductively changing current distribution is particularly suited for ship propulsion purposes. Numerous constructions and arrangements of the secondary winding for obtaining an inductively changing current distribution in the secondary circuit will suggest themselves to those skilled in the art. The motor must be designed primarily so that the secondary circuit will have a relatively high effective resistance when the secondary current is of high frequency, and secondarily so that the secondary circuit will have a relatively low effective resistance when the secondary current is of low frequency. It will, of course, be understood that I mean by secondary current of high frequency, current of that frequency induced in the secondary winding when the slip of the motor is relatively large, and by current of low frequency, current of that frequency induced in the secondary winding when the slip of the motor is relatively small.

I believe that such a secondary winding of inductively changing effective resistance can best be obtained by constructing the winding of two separate and independent sections. Each section in reality constitutes a complete winding in itself, but I have, unless otherwise noted, used the expression "secondary winding" in the specification and claims of this application to cover the entire secondary winding regardless of the number of independent sections into which such winding is divided. One section of my preferred construction of secondary winding has relatively high ohmic resistance and low reactance, while the other section has relatively low ohmic resistance and high reactance.

I have employed the expression relatively high resistance to designate the effective resistance of the secondary winding under certain conditions with relation to its effective resistance under other conditions and without regard to the actual value of the resistance. It will accordingly be understood that the word relatively, as herein employed, refers to the relative resistance of the secondary winding under different conditions, as when the frequency of the secondary current is high or low, and, in other cases, to the relative resistance of different sections of the secondary winding.

In the drawings, I have designated the relatively high resistance winding by reference character 13 and the relatively low resistance winding by reference character 14. The high resistance winding is located in slots near the surface of the rotor and has little inductance. On the other hand, the low resistance winding is located in slots beneath the surface of the rotor, and being substantially embedded in the iron of the rotor has high inductance. The arrangement of the bars of the secondary winding will be better understood by reference to Fig. 2 of the drawings. The two sections of the secondary winding are mechanically independent and each is of the well known squirrel cage type.

It will be understood by those skilled in the art that other arrangements of the sections of the secondary winding may be made without departing from the spirit of my invention. It will further be understood that a winding having two sections is not necessary; and I have merely described such a winding as constituting what I now consider a preferred construction for the purposes of electric ship propulsion. Those skilled in the art will, however, realize that the same characteristics may be obtained by the use of a properly designed secondary winding of one section.

I have found that resistance material having a specific resistance about fourteen times that of copper well suited for the conductor bars of the high resistance winding 13. The mass of material employed in this winding is further designed to give a considerable heat storage capacity. The conductor bars of the winding 14 are made of low resistance material to give this section of winding a low ohmic resistance, and are also designed to have considerable heat storage capacity.

On account of its high self induction, the winding 14 will carry very little current when the frequency of the secondary current is high, and consequently under this condition the secondary current will be forced into the high resistance winding 13, thus producing a satisfactory torque of the motor when the slip is large. On the other hand, as the frequency of the secondary current diminishes, more and more current will flow through the low resistance winding 14 until at normal slip the motor has the desirable running characteristics of an induction motor with an ordinary squirrel cage secondary winding. It will thus be seen that the current distribution of the secondary current is automatically changed by inductive action to produce the desired operating requirements for all speeds of the motor.

The effect of the secondary winding illustrated herein is to give normal slip of the motor and efficiency of at least 95 per cent. under full load, and a speed-torque curve so shaped that the torque when the motor is standing still is about 70 per cent. of the full load running torque with about twice normal current in the primary circuit. The generator is proportioned to give this abnormal current to the motor. To do so, however, requires some additional excitation. This additional excitation is provided when the controller 18 coöperates with contact 21, under which condition no resistance is included in the field winding of the exciter and the alternator is operating with maximum excitation. This over-excitation is of such an amount as to render the operation of the alternator inefficient if such a strong field were constantly maintained, and accordingly the rheostat is provided with contact 19 which is designed when the controller 18 coöperates therewith to furnish the normal and most efficient excitation for the alternator.

Under normal operating conditions of the ship the controller 18 will coöperate with contact 19. The controller is preferably arranged to be locked in this position since it will be the normal position of the controller when the ship is navigating at normal speed. In the drawings I have shown a lug 28 on the controller adapted to engage with spring catches 29 for holding the controller in engagement with either of the contacts 19.

A spring 30 is operatively connected to the controller and tends to maintain the controller in an off position, that is, with the field circuit of the exciter open. The controller is, therefore, arranged through the action of the spring 30 to coöperate with contact 21 only when manually held in engagement with this contact. The spring thus tends to resist the movement of the controller into engagement with contact 21 so that the condition of over-excitation of the alternator can be maintained only by manual control.

When in the maneuvering of the ship it is desired to decrease the speed of the ship's propeller the controller is moved from contact 21 toward contact 20, thereby including additional resistance in the field winding of the exciter and diminishing the excitation of the alternator, and consequently its terminal voltage. The reduction in terminal voltage reduces the torque of the propeller driving motor and increases the slip of the motor which results in a decreased speed of the ship's propeller.

During reversal and also during the starting and accelerating stages of the ship the power factor of the propeller driving motors is low and the kilovolt-amperes required to produce the necessary starting and accelerating torque will be approximately fifty per cent. greater than the normal kilovolt-amperes required when the motors are running at full speed. These increased kilovolt-amperes could of course be obtained by providing an alternator having a normal rated kilovolt-ampere capacity fifty per cent. greater than required for normal navigating operation of the propeller driving motors. I prefer, however, to obtain this increased kilovolt-ampere output of the alternator by forcing the excitation of the alternator, that is, by over-exciting the alternator as hereinbefore mentioned. The alternator is, therefore, designed so that its kilovolt-ampere output under the most efficient operating conditions is substantially equal to the kilovolt ampere demand of the propeller driving motors during normal navigation, and also so that the excitation of the alternator can be forced to produce a kilovolt-ampere output fifty per cent. greater than the normal kilovolt-ampere output. The alternator is further designed so that its kilovolt-ampere output at low voltage is great enough to maintain the desired corresponding speed of the propeller driving motors.

The proportions of the secondary winding of the induction motor are such that the heat storage capacity in the conductors of the winding alone is sufficient to cover a two minute reversal operation with maximum excitation of the alternator without producing temperature rises that could be considered in any way objectionable. This heat storage capacity together with such heat removal as will be afforded by the iron of the motor will make the interval of safe reversal, with the ship moving in the opposite direction, about three or four minutes, or as much time as will be required in ordinary maneuvering.

The particular design of secondary winding employed in the propeller driving motors of my system insures a high starting torque on account of the high reactance of one section of the winding. The further provision of means for over-exciting the alternator insures a starting torque of the motors adequate for all conditions met with in the maneuvering of the ship. When the ship is being maneuvered, as in reversing from full speed ahead, or maneuvering in harbors or about wharves, the alternator will generally be over-excited, and under these conditions the torque of the propeller driving motors will be very materially increased, and increased sufficiently so that the motors will come up to speed without difficulty under the load which the propellers impose upon them.

It will be seen from the foregoing description that I have provided a system of electric ship propulsion in which induction motors having permanently short circuited secondary windings can be successfully employed when the motor possesses certain characteristics. These characteristics are assured when the secondary winding has a relatively high effective resistance when the secondary current is of high frequency. Further, and more specifically, I have provided a system of ship propulsion comprising an induction motor with a short circuited rotor winding in combination with a polyphase alternator with direct electrical connection between the alternator and the motor, and a controller for the field excitation of the alternator so arranged that the different maneuvering speeds forward and backward of the ship are obtained by varying the field strength of the alternator, whereas the reversing of the phase rotation between the motor and the alternator occurs at a position of the controller where the field of the alternator is not excited. The controller is provided with an off position and a continuous set of running points for forward and another set of running points for backward operation, and is further arranged when in operative relation to one point to cut all resistance out of the alternator field circuit thereby producing maximum and over-excitation of the alternator.

The particular advantage of this system of propulsion, lies not only in the elimination of all controlling devices in the secondary circuit of the induction motor, but also in the elimination of all controlling devices in the primary circuit, which need to be designed for heavy current. A further and decided advantage of the system of control resides in the reversal of the direction of rotation of the propellers while there is no voltage on the system.

Those skilled in the art will appreciate that my invention is susceptible of numerous modifications, and accordingly I do not desire to limit myself to the particular arrangement and design of apparatus herein described. I, therefore, aim in the appended claims to cover all modifications which are within the spirit and scope of my invention.

What I claim as new and desire to secure by Letters Patent of the United States, is:—

1. In a system of electric ship propulsion including an electric generator arranged to deliver electric energy to an electric motor operatively coupled to a propeller, the method of reversing the direction of motion of the ship which comprises reversing the connections of said motor and simultaneously increasing the excitation of said generator above its normal running excitation.

2. In a system of electric ship propulsion including an alternating current generator arranged to deliver electric energy to a polyphase induction motor operatively coupled to a propeller, the method of reversing the direction of motion of the ship which comprises reversing the phase rotation between the motor and the generator and simultaneously increasing the excitation of said generator above its normal running excitation.

3. A system of ship propulsion, comprising in combination a polyphase alternator, a polyphase induction motor electrically connected to said alternator, a propeller operatively connected to said motor, and means for reversing the direction of rotation of said propeller consisting of means for reversing the direction of rotation of said motor and means for simultaneously increasing the excitation of said alternator.

4. In a system of electric ship propulsion including an alternating current generator arranged to deliver electric energy to a polyphase induction motor operatively coupled to a propeller, the method of reversing the direction of motion of the ship which comprises reversing the phase rotation between the motor and the generator and increasing the torque of the motor during the act of reversal by increasing the excitation of the generator.

5. An electric system of ship propulsion, comprising in combination an alternating current generator, an induction motor electrically connected to said generator and having a permanently short circuited secondary winding of variable effective resistance, a propeller operatively connected to said motor, means for reversing the direction of rotation of the motor and of the propeller consisting of means for reversing the phase rotation between the motor and the generator and of means for simultaneously increasing the excitation of the generator, the effective resistance of said short circuited secondary winding being relatively low under normal navigating conditions and being relatively high during the reversal of the propeller.

6. A system of ship propulsion, comprising in combination a polyphase alternator, an induction motor having a polyphase primary winding electrically connected to said alternator, a propeller operatively connected to said motor, means for producing over-excitation of said alternator whereby the torque of said motor can be increased, such over-excitation being of such an amount as to render the operation of the alternator inefficient if maintained under normal navigation, and means whereby the condition of over-excitation of said alternator can be maintained only by manual control.

7. An electric system of ship propulsion, comprising in combination an alternating current generator, an induction motor electrically connected to said generator, a propeller operatively connected to said motor, means for reversing the direction of rotation of the motor and of the propeller, and means for increasing the excitation of said generator above its normal and efficient excitation when the propeller is reversed.

8. An electric system of ship propulsion, comprising in combination an alternating current generator, an induction motor electrically connected to said generator, a propeller operatively connected to said motor, means for increasing the excitation of said generator above its normal and efficient excitation for increasing the torque of said motor, a controller for making the desired electrical connections of the system including those of said last mentioned means, and means whereby the controller can be maintained in its starting positions ahead or astern and its position for obtaining said increased excitation of the generator only by manual control.

In witness whereof, I have hereunto set my hand this 24th day of April, 1913.

ERNST F. W. ALEXANDERSON.

Witnesses:
BENJAMIN B. HULL,
HELEN ORFORD.